(12) United States Patent
Murata et al.

(10) Patent No.: US 11,879,878 B2
(45) Date of Patent: Jan. 23, 2024

(54) GAS SEPARATION SYSTEM

(71) Applicant: SHIMADZU CORPORATION, Kyoto (JP)

(72) Inventors: Tasuku Murata, Kyoto (JP); Mitsuru Nishishita, Kyoto (JP); Shigeo Yasui, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 414 days.

(21) Appl. No.: 17/422,794

(22) PCT Filed: Aug. 6, 2019

(86) PCT No.: PCT/JP2019/030865
§ 371 (c)(1),
(2) Date: Jul. 14, 2021

(87) PCT Pub. No.: WO2020/170472
PCT Pub. Date: Aug. 27, 2020

(65) Prior Publication Data
US 2022/0128524 A1   Apr. 28, 2022

(30) Foreign Application Priority Data

Feb. 19, 2019   (JP) .................. 2019-027074

(51) Int. Cl.
*G01N 30/00* (2006.01)
*G01N 30/54* (2006.01)
(Continued)

(52) U.S. Cl.
CPC .......... *G01N 30/54* (2013.01); *B01D 53/025* (2013.01); *G01N 30/62* (2013.01); *B01D 2253/106* (2013.01); *G01N 2030/025* (2013.01)

(58) Field of Classification Search
None
See application file for complete search history.

(56) References Cited

U.S. PATENT DOCUMENTS 5,447,556 A * 9/1995 Pleil ..................... G01N 30/12
95/87
2011/0048068 A1   3/2011 Valor Herencia et al.
2019/0391117 A1  12/2019 Yamazaki

FOREIGN PATENT DOCUMENTS

JP          63-204147 A      8/1988
JP          63204147 A   *  8/1988
(Continued)

OTHER PUBLICATIONS

International Search Report of PCT/JP2019/030865 dated Nov. 5, 2019 [PCT/ISA/210].

(Continued)

*Primary Examiner* — Brandi N Hopkins
*Assistant Examiner* — Nigel H Plumb
(74) *Attorney, Agent, or Firm* — Sughrue Mion, PLLC

(57) ABSTRACT

A gas separation system includes a separation column for separating components contained in sample gas, a sample gas supplier fluidly connected to an inlet of the separation column for supplying sample gas to the separation column, a detector fluidly connected to an outlet of the separation column, a collection tube filled with an adsorbent having a property of adsorbing a target component in the sample gas under a condition of a first temperature or less and desorbing the adsorbed target component under a condition of a second temperature or more higher than the first temperature, a temperature adjuster for adjusting a temperature of the collection tube, a collection container for collecting the target component, and a switching mechanism for switching between a state in which the collection tube is connected to (Continued)

an outlet of the detector and a state in which the collection tube is connected to the collection container.

6 Claims, 5 Drawing Sheets

(51) Int. Cl.
*B01D 53/02* (2006.01)
*G01N 30/62* (2006.01)
*G01N 30/02* (2006.01)

(56) References Cited

FOREIGN PATENT DOCUMENTS

| | | |
|---|---|---|
| JP | 6-180308 A | 6/1994 |
| JP | 2004-108967 A | 4/2004 |
| JP | WO2018167910 A1 * | 9/2018 |
| WO | 2018/167910 A1 | 9/2018 |

OTHER PUBLICATIONS

Written Opinion of PCT/JP2019/030865 dated Nov. 5, 2019 [PCT/ISA/237].
Communication dated Dec. 7, 2021, issued by the Japanese Patent Office in application No. 2021-501531.
Chinese Office Action dated Jul. 27, 2023 in Application No. 201980088401.8.

* cited by examiner

GAS SEPARATION SYSTEM

CROSS REFERENCE TO RELATED APPLICATIONS

This application is a National Stage of International Application No. PCT/JP2019/030865 filedon Aug. 6, 2019, claiming priority based on Japanese Patent Application No. 2019-027074 filed on Feb. 19, 2019.

TECHNICAL FIELD

The present invention relates to a gas separation system.

BACKGROUND ART

In order to extract a target component in mixed gas obtained by an organic synthesis reaction or the like with high purity, a precision distillation apparatus is generally used. However, an amount of the purified gas obtained in one purification by the precision distillation apparatus is 1 g or less. Further, since gas is difficult to handle, it is not easy to realize highly accurate purification.

Further, it has also been proposed to fractionate a component contained in a sample using a gas chromatograph (see Patent Document 1). A device proposed in Patent Document 1 is configured to liquefy a target component eluted from a separation column at an ultra-low temperature and to collect the target component in a container.

PRIOR ART DOCUMENT

Patent Document

Patent Document 1: Japanese Patent Laid-open Publication No. 11-218529

SUMMARY OF THE INVENTION

Problems to be Solved by the Invention

In the configuration in which a target component eluted from a separation column is liquefied and collected in a container as described above, there is possibility that the system is blocked by a liquefied substance, and that the target component cannot be stably fractionated.

The present invention has been made in view of the above problem, and an object of the present invention is to provide a gas separation system capable of highly efficiently and stably fractionating a target component.

Solutions to the Problems

A gas separation system according to the present invention includes a separation column for separating components contained in sample gas from each other, a sample gas supplier that is fluidly connected to an inlet of the separation column and for supplying sample gas to the separation column, a detector that is fluidly connected to an outlet of the separation column and detects the components in gas flowing out of the separation column, a collection tube filled with an adsorbent having a property of adsorbing a target component in the sample gas under a condition of a first temperature or less and desorbing the adsorbed target component under a condition of a second temperature or more higher than the first temperature, a temperature adjuster for adjusting a temperature of the collection tube by cooling and heating the collection tube, a collection container for collecting the target component desorbed from the adsorbent of the collection tube, and a switching mechanism for switching between a first state in which the collection tube is connected to an outlet of the detector so that fluid flowing out of the detector passes through the collection tube and a second state in which the collection tube is connected to the collection container. A temperature of the collection tube is set to be at the first temperature or less and the switching mechanism is set to be in the first state and the target component in fluid flowing out of the detector is guided to the collection tube so that the target component is adsorbed on the adsorbent, and the switching mechanism is set to be in the second state and the collection tube in which the target component is adsorbed on the adsorbent is set to be at the second temperature or more so that the target component is collected in the collection container.

Effects of the Invention

According to the gas separation system of the present invention, the temperature of the collection tube is set to be the first temperature or less, the switching mechanism is set to be in the first state and the target component in the fluid flowing out of the detector is guided to the collection tube so that the target component is adsorbed on the adsorbent, and the switching mechanism is set to be in the second state and the collection tube in which the target component is adsorbed on the adsorbent is set to be at the second temperature so that the target component is collected in the collection container. Therefore, a gas separation system capable of highly efficiently and stably fractionating a target component is provided.

EMBODIMENT OF THE INVENTION

An embodiment of the gas separation system will be described with reference to the drawings.

Figure 1:
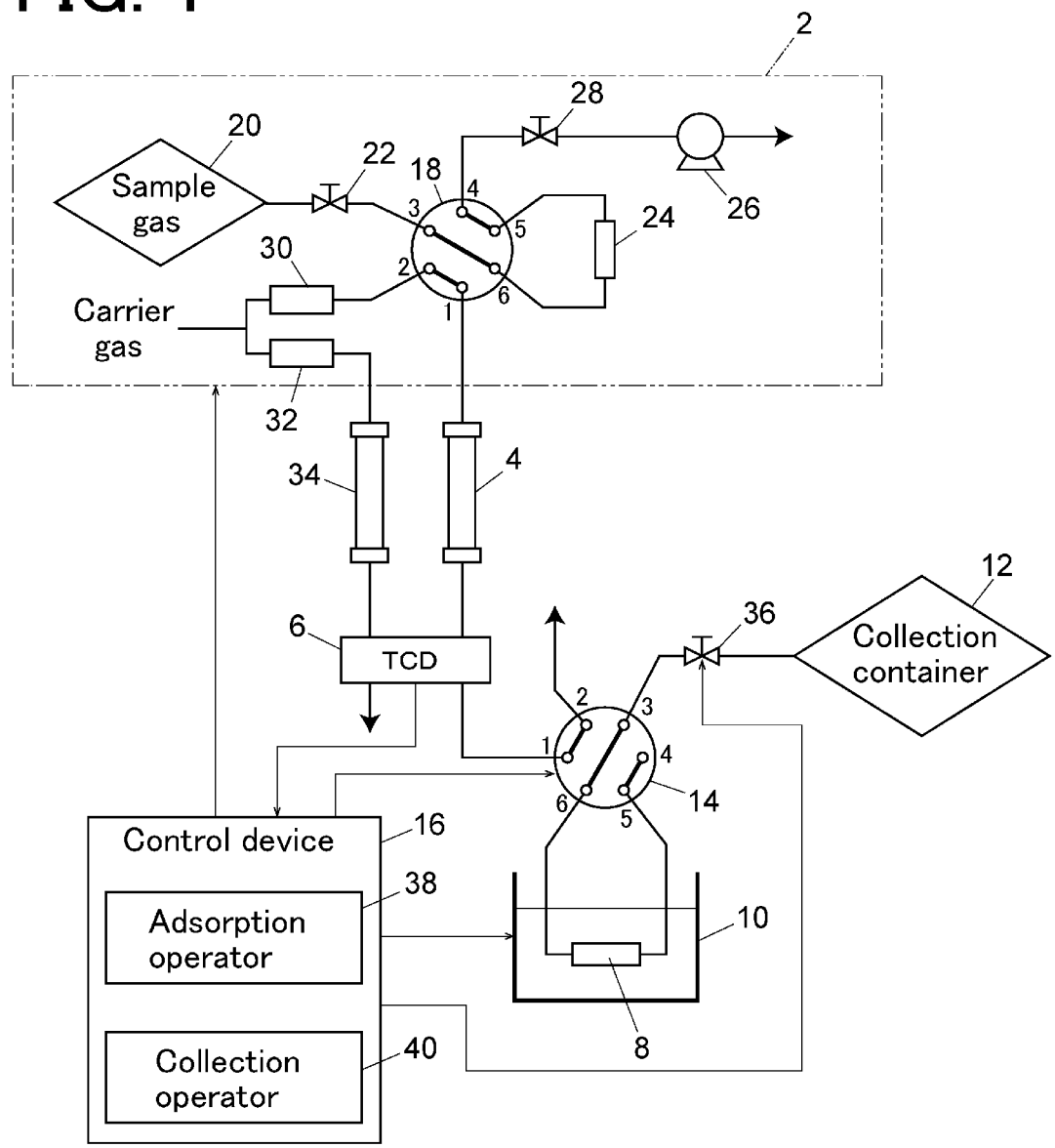
FIG. 1 is a schematic configuration diagram illustrating an embodiment of a gas separation system.

As shown in FIG. 1, an embodiment of the gas separation system mainly includes a sample gas supplier 2, a separation column 4, a detector 6, a collection tube 8, a temperature adjuster 10, a collection container 12, a switching valve 14, and a control device 16.

The sample gas supplier 2 is for supplying sample gas to the separation column 4, and includes a switching valve 18, a sample gas source 20, a stop valve 22, a metering pipe 24, a pump 26, a stop valve 28, and flow controllers 30 and 32. The switching valve 18 is a 6-port 2-position valve having ports 1 to 6, and is switched to one of a first state (state of FIG. 1) in which the ports 1 and 2, 3 and 6, and 4 and 5 are in fluid communication, and a second state (state of FIGS. 2 and 3) in which the ports 1 and 6, 2 and 5, and 3 and 4 are in fluid communication. An inlet of the separation column 4 is connected to port 1 of the switching valve 18, a carrier gas source is connected to port 2 via the flow controller 30, the sample gas source 20 is connected to port 3 via the stop valve 22, the pump 26 is connected to port 4 via the stop valve 28, one end of the metering pipe 24 is connected to port 5, and the other end of the metering pipe 24 is connected to port 6.

The sample gas supplier 2 sucks the sample gas 20 by the pump 26 in a state where the switching valve 18 is in the first state (the state of FIG. 1) and the stop valves 22 and 28 are opened to fill the metering pipe 24 with the sample gas, and, after that, sets the switching valve 18 in the second state (the state of FIGS. 2 and 3) and introduces carrier gas into the metering pipe 24 to supply the sample gas with which the metering pipe 24 is filled to the separation column 4. In the present embodiment, internal volume of the metering pipe 24 is 100 mL or more. That is, the sample gas supplier 2 can supply 100 mL or more of sample gas to the separation column 4 at a time.

The separation column 4 is for separating sample gas supplied by the sample gas supplier 2 for each component. In the present embodiment, since the sample gas supplier 2 supplies 100 mL or more of sample gas at a time to the separation column 4 (a supply amount of sample gas to a separation column of a normal gas chromatograph is about 0.5 to 5 mL), a column having an inner diameter and a length larger than those of a separation column used for a normal gas chromatograph is used as the separation column 4 so that such a large volume of sample gas can be separated. Specifically, a separation column having an inner diameter of about 3 mm is used in a normal gas chromatograph, whereas the separation column 4 of the present embodiment has an inner diameter of 6 mm or more. Further, separation efficiency is improved by increasing the head pressure of the column by making the length of the separation column 4 about 6 mm which is longer than that of a normal gas chromatograph. In this manner, separation of a large volume of sample gas of 100 mL or more can be realized.

Further, in a case where the sample gas is organic fluorocarbon-based gas, a filler of a copolymer of divinylbenzene, ethylvinylbenzene, and ethylene glycol dimethacrylate (for example, Porapak N and Sanpak X (both are products of GL Sciences Inc.)) can be used as the filler of the separation column 4.

An outlet of the separation column 4 is connected to an inlet of the detector 6. In the present embodiment, a thermal conductivity detector (TCD) is used as the detector 6. A resistance column 34 is provided separately from the separation column 4. One end of the resistance column 34 is connected to a carrier gas source via the flow controller 32, and the other end of the resistance column 34 is also connected to the detector 6. Carrier gas flowing through the resistance column 34 passes through a cell of the detector 6 as reference gas.

Note that, although not illustrated, the separation column 4 and the resistance column 34 are accommodated in a column oven, and temperatures of the separation column 4 and the resistance column 34 are adjusted to a temperatures set as an analysis condition.

The switching valve 14 is a 6-port 2-position valve having ports 1 to 6. An outlet of the detector 6 is connected to port 1 of the switching valve 14, port 2 is opened to the atmosphere, the collection container 12 is connected to port 3 via a stop valve 36, port 4 is closed, one end of the collection tube 8 is connected to port 5, and the other end of the collection tube 8 is connected to port 6. The switching valve 14 constitutes a switching mechanism for switching between a first state (state of FIG. 3) in which the collection tube 8 is fluidly connected to an outlet of the detector 6 and a second state (state of FIGS. 1 and 2) in which the collection tube 8 is fluidly connected to the collection container 12.

The inside of the collection tube 8 is filled with an adsorbent having a property of adsorbing a target component under a condition of a first temperature (for example, 0° C.) or lower and desorbing a target component under a condition of a second temperature (for example, 100° C.) or higher. In a case where the target component is fluorocarbon-based gas or alternative fluorocarbon gas, silica gel can be used as the adsorbent. Further, in a case where the target component is a rare gas element such as krypton, activated carbon can be used as the adsorbent.

The temperature adjuster 10 is for adjusting a temperature of the collection tube 8 to a desired temperature. In the present embodiment, as the temperature adjuster 10, a constant temperature water tank (for example, Neo-Cool Bath (product of Yamato Scientific co., ltd.)) having a function of adjusting an antifreezing solution to a set temperature can be used. Further, in a case where the collection tube 8 needs to be heated to a high temperature (for example, 100° C. or more), a column oven for heating the separation column 4 can be used as the temperature adjuster 10.

The control device 16 controls operation of the sample gas supplier 2 (the switching valve 18, the stop valve 22, the pump 26, the stop valve 28, and the flow controllers 30 and 32), the temperature adjuster 10, the switching valve 14, and the stop valve 36. A detection signal of the detector 6 is taken into the control device 16. The control device 16 can be realized by a dedicated computer or a general-purpose personal computer.

The control device 16 includes an adsorption operator 38 and a collection operator 40. The adsorption operator 38 and the collection operator 40 are functions obtained by a central processing unit (CPU) provided in the control device 16 executing a predetermined program.

The adsorption operator 38 is configured to execute adsorption operation of adsorbing a target component in the sample gas separated from other components in the separation column 4 to the adsorbent of the collection tube 8. The adsorption operation is operation of switching the switching valve 14 between the first state (the state of FIG. 3) and the second state (the state of FIG. 2) based on a detection signal of the detector 6 so as to supply the sample gas from the sample gas supplier 2 to the separation column 4 and guide gas containing only a target component separated from other components in the separation column 4 to the collection tube 8. At this time, the collection tube 8 is cooled to the first temperature or lower (For example, 0° C.), and the target component is adsorbed on the adsorbent in the collection tube 8. The adsorption operator 38 is configured to repeatedly execute such adsorption operation a predetermined number of times.

The collection operator 40 is configured to execute collection operation for heating the collection tube 8 to the second temperature or more (for example, 100° C.) by setting the switching valve 14 to the second state (the state of FIG. 2) and opening the stop valve 36 after a predetermined number of times of the adsorption operation is completed. By the collection operation, the target 8 component adsorbed on the adsorbent of the collection tube is separated from the adsorbent and collected in the collection container 12.

Figure 2:
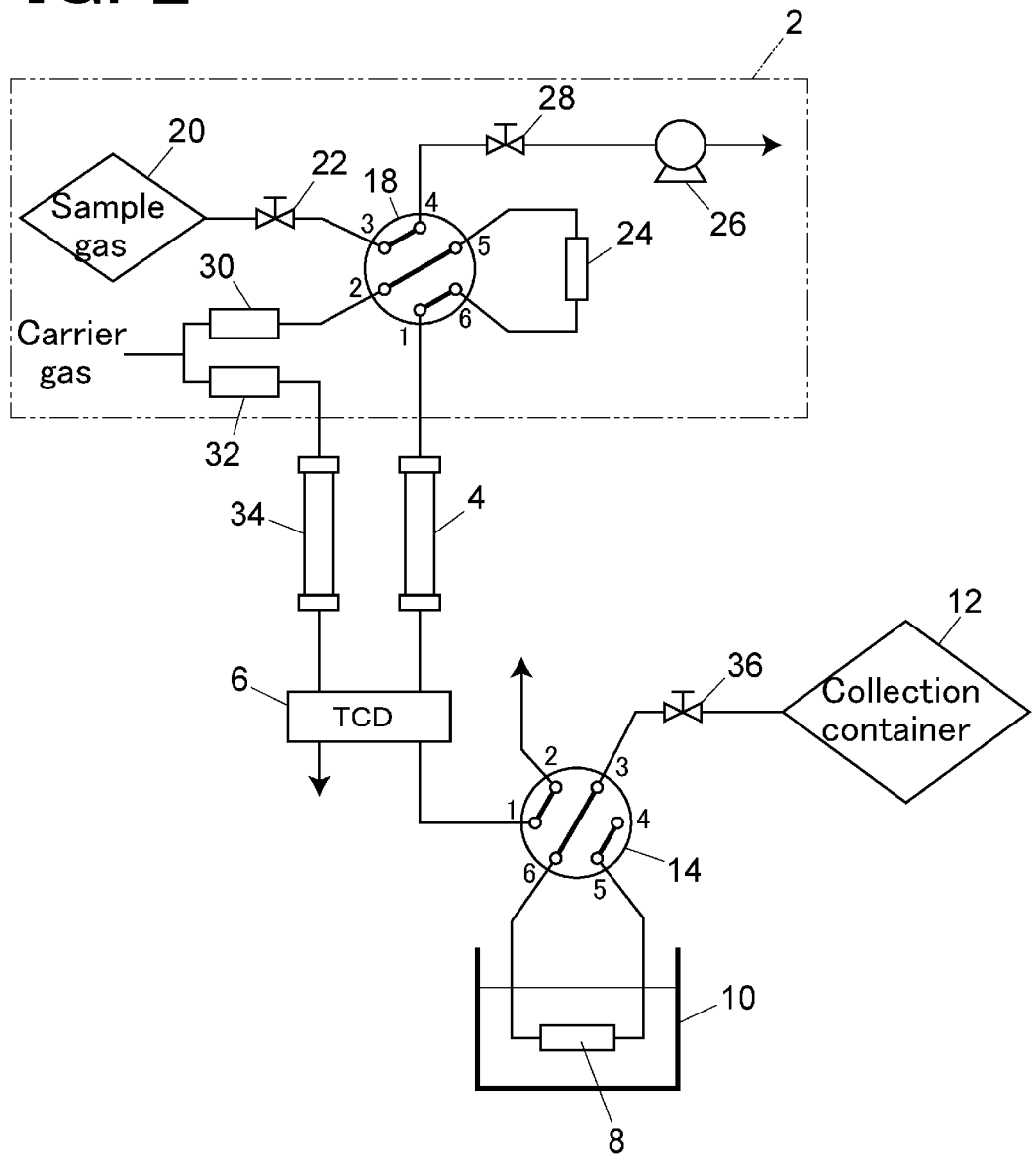
FIG. 2 is a schematic configuration diagram illustrating a state when sample gas is introduced into a separation column in the embodiment.
Figure 3:
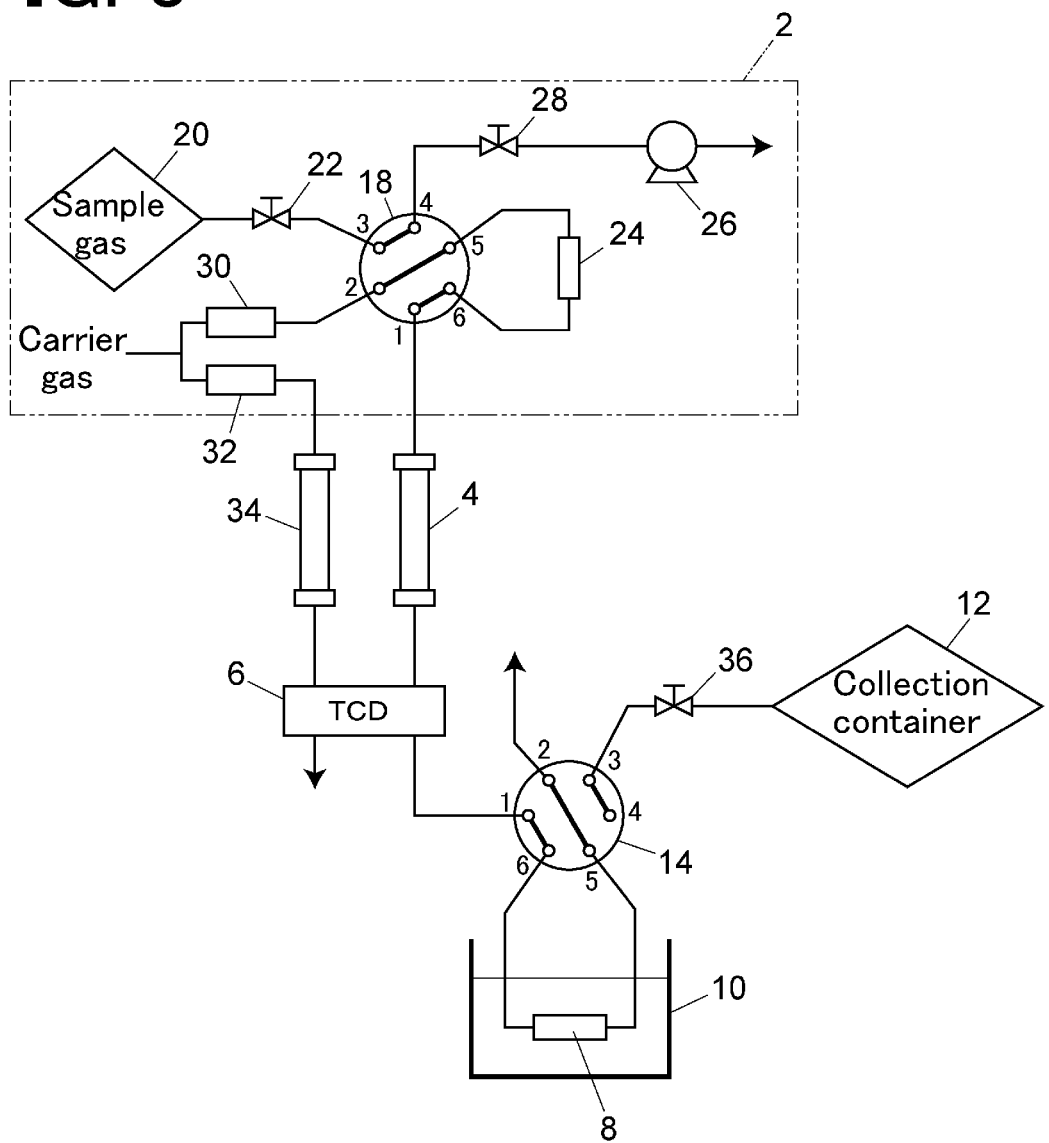
FIG. 3 is a schematic configuration diagram illustrating a state when a target component is collected in a collection tube in the embodiment.
Figure 4:
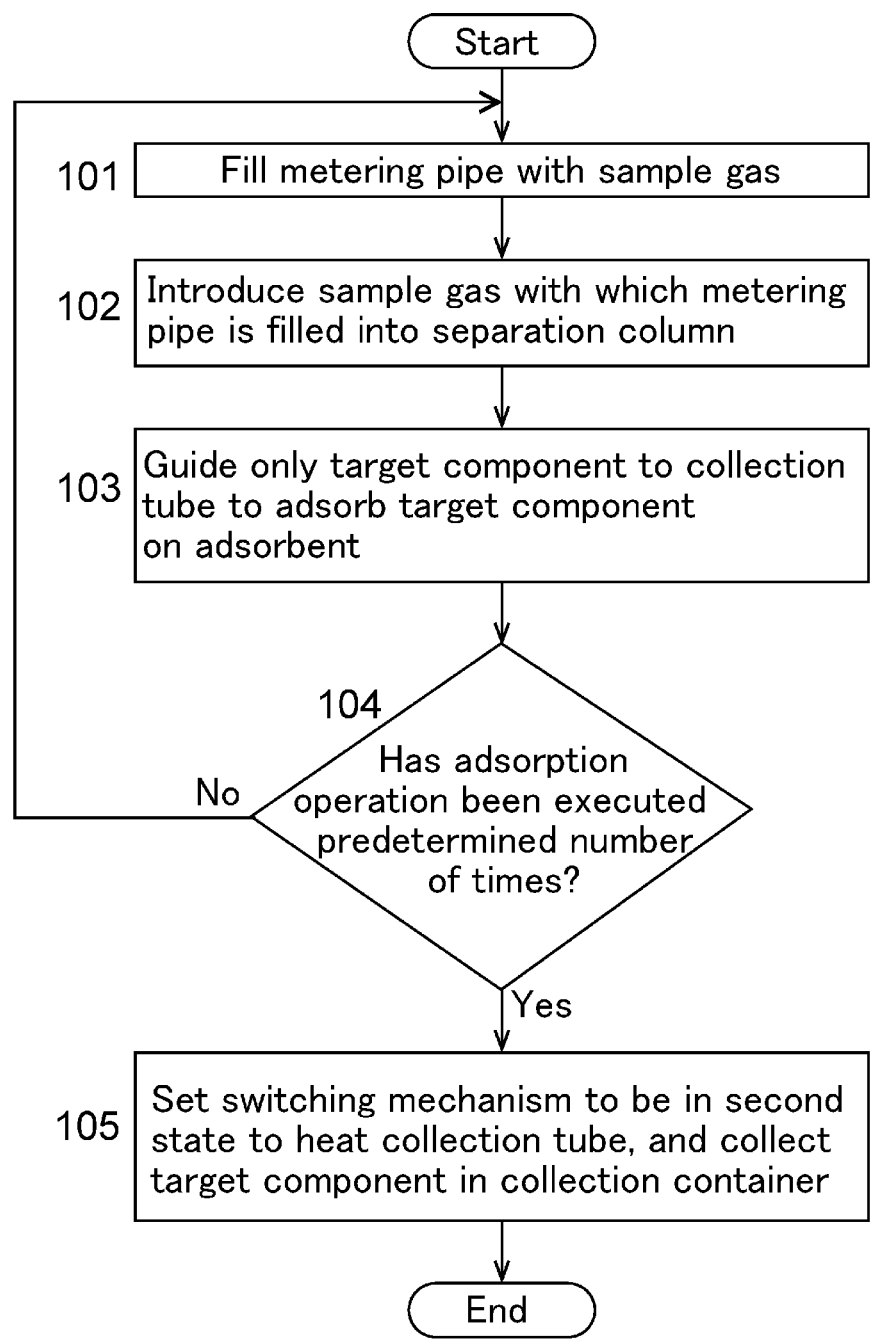
FIG. 4 is a flowchart showing an example of operation of the embodiment.

Operation of the present embodiment will be described with reference to the flowchart of FIG. 4 together with FIGS. 1 to 3.

First, the adsorption operator 38 performs the adsorption operation (Steps 101 to 104). In the adsorption operation, the switching valve 18 is set to the state of FIG. 1, and the metering pipe 24 is filled with sample gas (Step 101). After that, the switching valve 18 is switched to the state of FIG. 2, and the sample gas with which the metering pipe 24 is filled is introduced into the separation column 4 (Step 102). While checking a detection signal of the detector 6, the adsorption operator 38 keeps the switching valve 14 in the second state (the state of FIG. 2) until a target component among components eluted from the separation column 4 reaches the switching valve 14, switches the switching valve 14 to the first state (the state of FIG. 3) at the timing when the target component reaches the switching valve 14, guides gas containing only the target component to the collection tube 8, and adsorbs the target component to the adsorbent (Step 103). The adsorption operator 38 repeats this adsorption operation a predetermined number of times (Step 104).

After a predetermined number of times of the adsorption operation is completed, the collection operator 40 performs the collection operation (Step 105). In the collection operation, the switching valve 14 (switching mechanism) is set to the second state (state of FIG. 2) and the stop valve 36 is opened, and the collection tube 8 is heated to a temperature equal to or more than the second temperature (for example, 100° C.) so that the target component is desorbed from the adsorbent and collected in the collection container 12 (Step 105).

Figure 5:
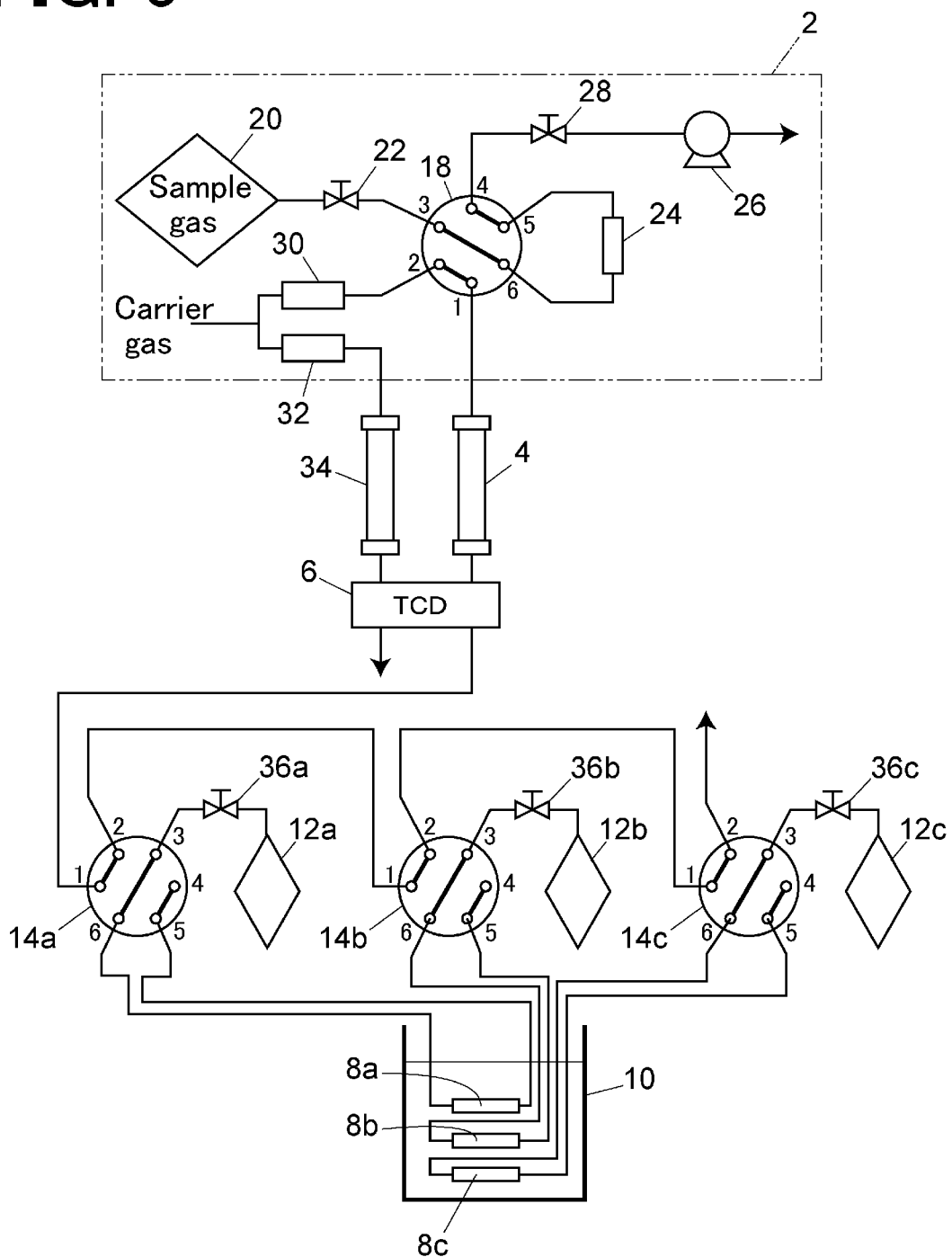
FIG. 5 is a schematic configuration diagram illustrating another embodiment of the gas separation system.

Note that, as shown in FIG. 5, a plurality of collection tubes 8a, 8b, and 8c and a plurality of collection containers 12a, 12b, and 12c may be incorporated in a system so that a larger amount of a target component can be fractionated. In the configuration of FIG. 5, switching valves 14a, 14b, and 14c are provided as the switching mechanism, and a state (first state) in which any one of the collection tubes 8a, 8b, and 8c is connected to an outlet of the detector 6 and a state (second state) in which the collection tubes 8a, 8b, and 8c are respectively connected to the collection containers 12a, 12b, and 12c can be obtained depending on the state of the switching valves 14a, 14b, and 14c.

The embodiment described above merely exemplifies an embodiment of the gas separation system according to the present invention. The embodiment of the gas separation system according to the present invention is as described below.

An embodiment of the gas separation system according to the present invention includes a separation column (4) for separating components contained in sample gas from each other, a sample gas supplier (2) that is fluidly connected to an inlet of the separation column (4) and for supplying sample gas to the separation column (4), a detector (6) that is fluidly connected to an outlet of the separation column (4) and detects the components in gas flowing out of the separation column (4), a collection tube (8; 8a; 8b; 8c) filled with an adsorbent having a property of adsorbing a target component in the sample gas under a condition of a first temperature or less and desorbing the adsorbed target component under a condition of a second temperature or more higher than the first temperature, a temperature adjuster (10) for adjusting a temperature of the collection tube (8; 8a; 8b; 8c) by cooling and heating the collection tube (8; 8a; 8b; 8c), a collection container (12; 12a; 12b; 12c) for collecting the target component desorbed from the adsorbent of the collection tube (8; 8a; 8b; 8c), and a switching mechanism (14; 14a; 14b; 14c) for switching between a first state in which the collection tube (8; 8a; 8b; 8c) is connected to an outlet of the detector (6) so that fluid flowing out of the detector (6) passes through the collection tube (8; 8a; 8b; 8c) and a second state in which the collection tube (8; 8a; 8b; 8c) is connected to the collection container (12; 12a; 12b; 12c). A temperature of the collection tube (8; 8a; 8b; 8c) is set to be at the first temperature or less and the switching mechanism (14; 14a; 14b; 14c) is set to be in the first state and the target component in fluid flowing out of the detector (6) is guided to the collection tube (8; 8a; 8b; 8c) so that the target component is adsorbed on the adsorbent, and the switching mechanism (14; 14a; 14b; 14c) is set to be in the second state and the collection tube (8; 8a; 8b; 8c) in which the target component is adsorbed on the adsorbent is set to be at the second temperature or more so that the target component is collected in the collection container (12; 12a; 12b; 12c).

A first aspect of the above embodiment of the gas separation system according to the present invention includes an adsorption operator (38) configured to control operation of the sample gas supplier (2), the temperature adjuster (10), and the switching mechanism (14; 14a; 14b; 14c), and to execute adsorption operation of setting a temperature of the collection tube (8; 8a; 8b; 8c) to be the first temperature or less and setting the switching mechanism (14; 14a; 14b; 14c) to be in the first state, supplying a predetermined amount of sample gas from the sample gas supplier (2) to the separation column (4), and guiding gas containing only the target component separated from other components in the separation column (4) to the collection tube (8; 8a; 8b; 8c) to adsorb the target component on the adsorbent. According to such an aspect, the adsorbing operation of adsorbing a target component on the adsorbent in the collection tube (8; 8a; 8b; 8c) can be automatically executed.

The first aspect may further include a collection operator configured to control operation of the sample gas supplier (2), the temperature adjuster (10), and the switching mechanism (14; 14a; 14b; 14c), and to execute, after the adsorption operation, collection operation of setting the switching mechanism (14; 14a; 14b; 14c) to be in the second state, setting the collection tube (8; 8a; 8b; 8c) in which the target component is adsorbed on the adsorbent to be at the second temperature or more, and collecting the target component in the collection container (12; 12a; 12b; 12c). In this manner, the collection operation of collecting a target component adsorbed on the adsorbent in the collection tube (8; 8a; 8b; 8c) in the collection container (12; 12a; 12b; 12c) can be automatically executed.

In a case of the above, the adsorption operator (38) may be configured to execute the adsorption operation a plurality of times, and the collection operator (40) may be configured to execute the collection operation after the plurality of times of the adsorption operation is completed. This makes it possible to automatically execute fractionation of a large amount of a target component.

Further, a second aspect of the above embodiment of the gas separation system according to the present invention includes a plurality of the collection tubes (8; 8a; 8b; 8c), and the switching mechanism (14; 14a; 14b; 14c) is configured to connect any one of the plurality of the collection tubes (8; 8a; 8b; 8c) to an outlet of the detector (6) in the first state. According to such an aspect, an amount of a target component that can be adsorbed on the adsorbent can be increased, and a larger amount of the target component can be fractionated. This second aspect can be combined with the first aspect.

Further, in a third aspect of the embodiment of the gas separation system according to the present invention, the adsorbent is silica gel. This third aspect can be freely combined with the first aspect and the second aspect described above.

DESCRIPTION OF REFERENCE SIGNS

2: Sample gas supplier
4: Separation column
6: Detector
8, 8a, 8b, 8c: collection tube
10: Temperature adjuster
12, 12a, 12b, 12c: collection container
14, 14a, 14b, 14c: Switching valve (switching mechanism)
16: Control device
18: Switching valve
20: Sample gas source
22, 28, 36: Stop valve
24: Metering pipe
26: Pump
30, 32: Flow controller
34: Resistance column
38: Adsorption operator
40: collection operator

The invention claimed is:

1. A gas separation system comprising:
a separation column for separating components contained in sample gas from each other;
a sample gas supplier that is fluidly connected to an inlet of the separation column and for supplying sample gas to the separation column;
a detector that is fluidly connected to an outlet of the separation column and detects the components in gas flowing out of the separation column;
a collection tube filled with an adsorbent having a property of adsorbing a target component in the sample gas under a condition of a first temperature or less and desorbing the adsorbed target component under a condition of a second temperature or more higher than the first temperature;
a temperature adjuster for adjusting a temperature of the collection tube by cooling and heating the collection tube;
a collection container for collecting the target component desorbed from the adsorbent of the collection tube; and
a switching mechanism for switching between a first state in which the collection tube is connected to an outlet of the detector so that fluid flowing out of the detector passes through the collection tube and a second state in which the collection tube is connected to the collection container,
wherein a temperature of the collection tube is set to be at the first temperature or less and the switching mechanism is set to be in the first state and the target component in fluid flowing out of the detector is guided to the collection tube so that the target component is adsorbed on the adsorbent, and the switching mechanism is set to be in the second state and the collection tube in which the target component is adsorbed on the adsorbent is set to be at the second temperature or more so that the target component is collected in the collection container.

2. The gas separation system according to claim 1, further comprising an adsorption operator configured to control operation of the sample gas supplier, the temperature adjuster, and the switching mechanism, and to execute adsorption operation of setting a temperature of the collection tube to be the first temperature or less and setting the switching mechanism to be in the first state, supplying a predetermined amount of sample gas from the sample gas supplier to the separation column, and guiding gas containing only the target component separated from other components in the separation column to the collection tube to adsorb the target component on the adsorbent.

3. The gas separation system according to claim 2, further comprising a collection operator configured to control operation of the sample gas supplier, the temperature adjuster, and the switching mechanism, and to execute, after the adsorption operation, collection operation of setting the switching mechanism to be in the second state, setting the collection tube in which the target component is adsorbed on the adsorbent to be at the second temperature or more, and collecting the target component in the collection container.

4. The gas separation system according to claim 3, wherein
the adsorption operator is configured to execute the adsorption operation a plurality of times, and
the collection operator is configured to execute the collection operation after the plurality of times of the adsorption operation is completed.

5. The gas separation system according to claim 1, further comprising a plurality of the collection tubes, wherein
the switching mechanism is configured to connect any one of the plurality of collection tubes to an outlet of the detector in the first state.

6. The gas separation system according to claim 1, wherein the adsorbent is silica gel.

* * * * *